United States Patent
Yeo (10) Patent No.: US 6,664,663 B1
(45) Date of Patent: Dec. 16, 2003

(54) ASSEMBLY METHOD FOR A VOICE COIL MOTOR

(75) Inventor: Chee Tian Yeo, Singapore (SG)

(73) Assignee: Advanced Materials Technologies Pte. Ltd., Singapore (SG)

(*) Notice: Subject to any disclaimer, the term of this patent is extended or adjusted under 35 U.S.C. 154(b) by 143 days.

(21) Appl. No.: 09/721,721

(22) Filed: Nov. 27, 2000

(51) Int. Cl.$^7$ .............................. G11B 5/55; H02K 41/00
(52) U.S. Cl. ....................................... 310/12; 360/264.9
(58) Field of Search ............................ 310/12, 13, 14, 310/36, 156.19, 154.17; 360/264.7, 264.8, 264.9

(56) References Cited

U.S. PATENT DOCUMENTS

| | | | |
|---|---|---|---|
| 5,051,669 A | 9/1991 | Hsiao et al. | 318/119 |
| 5,177,383 A | 1/1993 | Sim | 310/13 |
| 5,193,037 A | 3/1993 | Pace | 360/106 |
| 5,204,572 A * | 4/1993 | Ferreira | 310/156.19 |
| 5,313,124 A | 5/1994 | Macpherson | 310/13 |
| 5,424,591 A | 6/1995 | Kuriyama | 310/12 |
| 5,576,583 A * | 11/1996 | Umehara | 310/13 |
| 5,585,981 A | 12/1996 | Lee | 360/106 |

FOREIGN PATENT DOCUMENTS

EP            0484658           9/1993           G11B/33/12

* cited by examiner

Primary Examiner—Nestor Ramirez
Assistant Examiner—Judson H. Jones
(74) Attorney, Agent, or Firm—George O. Saile; Stephen B. Ackerman (57) ABSTRACT

An interlocking assembly of a voice coil motor for a hard disk drive having an arcuate shaped hollow structure formed by metal injection molding. The hollow structure has a bottom plate member that is separated from a top plate member by a pair of upright members disposed therebetween. The upright members joined with the inside surfaces of the plate members. The uprights are disposed at each end of the hollow structure. A tapered recess is formed in the top surface of the bottom plate, the recess ingress's from a convex edge of the bottom plate and narrows while extending through to an opposite concave edge, the tapered recess has side edges shaped to tightly interlock with a flat arcuate shaped permanent magnet having dovetail side edges to slidely interlock with the tapered recess of the bottom plate of the hollow structure, thus eliminating the need for adhesive fastening.

18 Claims, 7 Drawing Sheets

ASSEMBLY METHOD FOR A VOICE COIL MOTOR

BACKGROUND OF THE INVENTION (1). Technical Field

This invention is concerned with improvements to the manufacturing methods for magnetic disk drives, and more particularly to an improved method for the assembly of a voice coil motor (VCM) used in magnetic disk drives, the components of which can be fabricated at a lower cost with greater accuracy.

(2) Description of the Prior Art

Voice coil motors, an integral driver device used for positioning magnetic heads in magnetic disk apparatus, are customarily used in numerous operations because of its structural simplicity and excellent performances as a driver for low inertia, high speed motions. In a magnetic disk apparatus, which is required to bring about fast and precision movements of a magnetic head from a particular disk position to another, using a voice coil motor needs less access time than other types of motors, therefore, are the most popular and widely used drivers for positioning magnetic heads in computer disk drives.

The following five documents relate to methods dealing with improvements to voice coil motors used on disk drives assemblies.

U.S. Pat. No. 5,051,669 issued Sep. 24, 1991 to Hsiao, et al, describes a voice coil motor provided with a set of improved shorted turn.

U.S. Pat. No 5,193,037 issued Mar. 9, 1993 to Pace, discloses a compact disk drive which is significantly reduced in overall length and depth.

U.S. Pat. No 5,177,383 issued Jan. 5, 1993 to Jun-seok Sim, discloses a voice coil motor which conveys a head of optical or magneto-optical disk or magnetic disk drive as a kind of linear motor.

U.S. Pat. No 5,424,591 issued Jun. 13, 1995 to Kuriyama, shows a compact disk drive yoke with a plurality of thin plates coated with a corrosion resistant material.

U.S. Pat. No 5,585,981 issued Dec. 17, 1996 to Lee, discloses an improved voice coil motor fastening device for a hard disk drive.

Typically, a voice coil motor is assembled from several parts and is then incorporated into a magnetic disk drive. A disk drive used as an auxiliary computer memory is a device manufactured with a high degree of precision. Several fastening methods for holding the parts together are used. Generally, fasteners such as screws were used to enable the completed product to be serviced when defective. As anticipated, however, the inclination within the industry was to merely reject defective assemblies rather than rework them which led to a different fastening method using adhesives. This led to a new set of processing problems involving adhesives which are still being evaluated. Outgassing and long term effects on materials within the hard disk drive, connective strength of the adhesive, curing time and adhesive fatigue are a few of such concerns.

Figure 1:
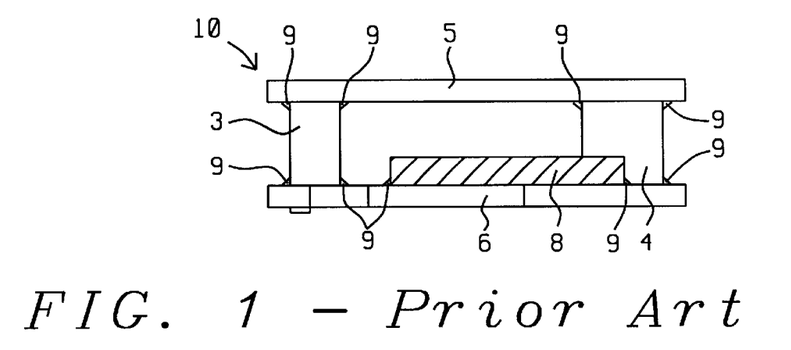
FIG. 1 is a side view illustration of a typical voice coil motor assembly of the prior art.
Figure 2:
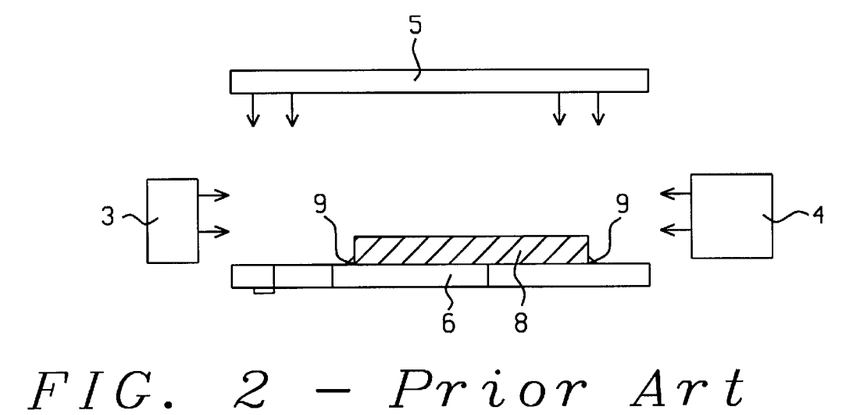
FIG. 2 shows a side exploded view of FIG. 1 with a permanent magnet in place.
Figure 3A:
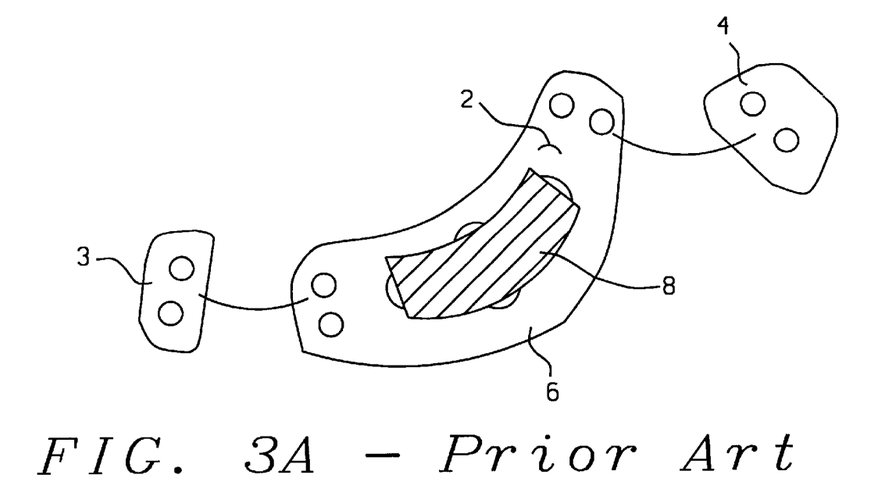
FIG. 3A is a top view of a lower plate of FIG. 1 with the permanent magnet in place.
Figure 3B:
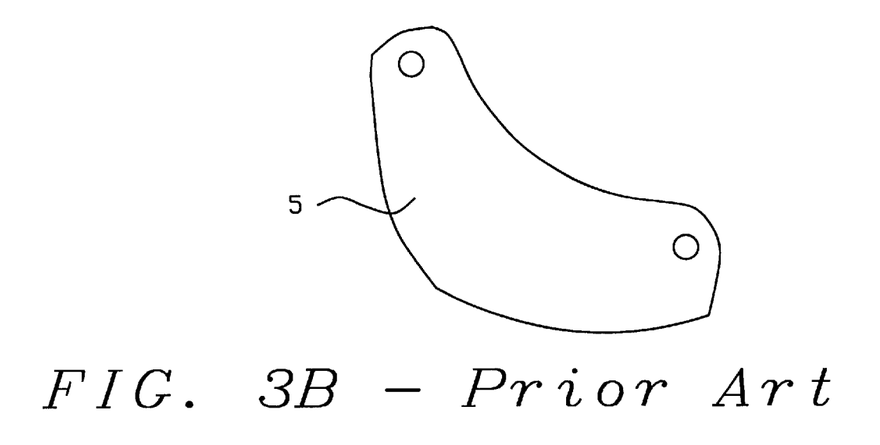
FIG. 3B is a top view of an upper plate of FIG. 1

FIG. 1, is a side view illustrating a voice coil motor 10 of the prior art, is produced by putting together essential parts, as shown in an exploded view in FIG. 2, typically including, an arcuate shaped top plate 5 having an upper 2 and lower surface, a matching bottom plate 6, two posts 3 and 4 used for spacing the plates apart, and a permanent magnet 8 disposed on the upper surface of the lower plate 6. The parts are usually joined together by indirect contact, for example, using an adhesive 9 interposed between the respective parts, or by direct contact using screw fasteners (not shown). FIGS. 3A and 3B show a top view of the top and bottom plates 5 and 6, respectfully, along with the side posts 3, 4. The permanent magnet 8 is shown disposed on the top surface of the lower plate 6 As alluded to earlier, the application of adhesives have several long term concerns, such as, outgassing, connective strength, and adhesive fatigue, there are also other assembly problems using adhesives. Among them are; contamination caused by poor application of the adhesive, controlling the spread of the layer of adhesive to within the outside boundaries of the parts, holding the parts within the magnetic field, and managing the storage and retrieval of parts for assembly.

SUMMARY OF THE INVENTION

It is therefore a primary object of the invention to provide an improvement over the prior art methods for assembly of the voice coil motor by minimizing the number of parts which will reduce cost while improving the overall design.

It is another object of the invention is to provide a more compact, space reducing assembly when the voice coil motor is fastened to a hard disk drive.

It is another object of the invention to reduce foreign material, such as adhesives, from the disk drive so that long term effects from outgassing from the adhesives, during curing is reduced and all other associated factors such as corrosion, contamination and other potentially harmful factors.

The foregoing objects of the invention are accomplished and the disadvantages of the prior art overcome by the provision of a disk drive including a voice coil motor assembly which is assembled without the use of adhesives.

To accomplish the objects of the present invention, there is provided a design of a voice coil motor that is assembled from fewer parts. This is achieved with a metal injection molded part that combines the function of several of the conventional parts into one. Moreover, features are designed within the molded part to releasably secure the magnets without the use of adhesives or fasteners.

DETAILED DESCRIPTION OF THE PREFERRED EMBODIMENT

Figure 4A:
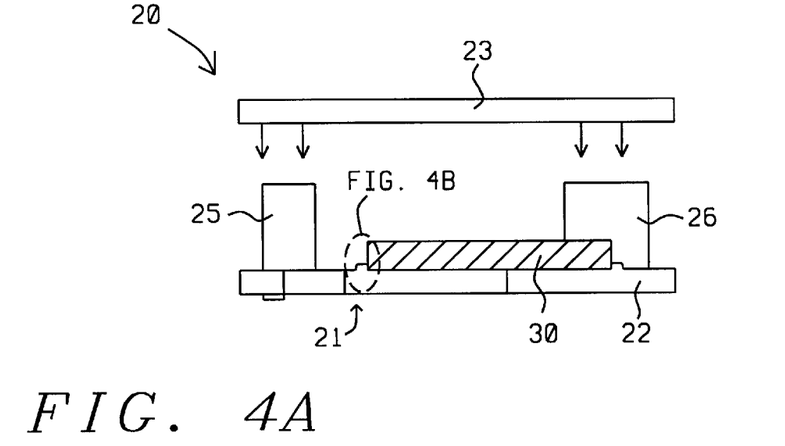
FIG. 4A illustrates a three in one bottom plate configuration showing an exploded side view of the invention.
Figure 4B:
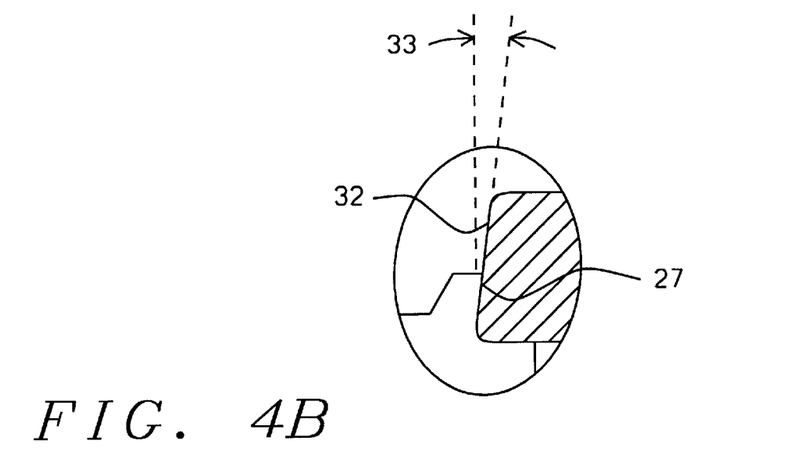
FIG. 4B shows an enlarged fragmented view of Detail 4.
Figure 4C:
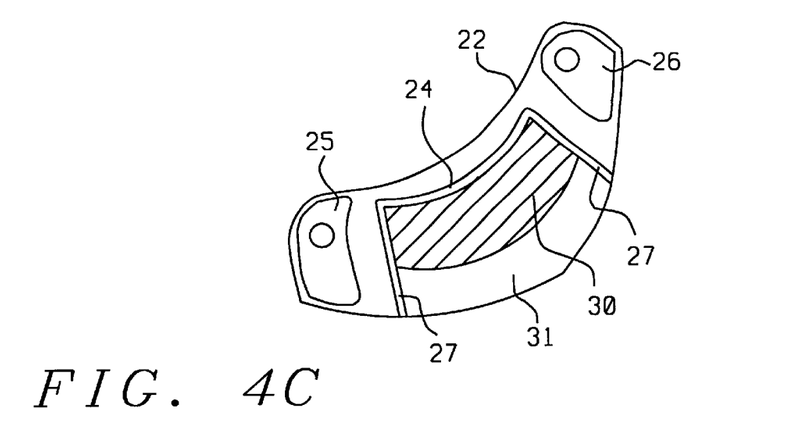
FIG. 4C is a top view of a lower plate of FIG. 4A.
Figure 4D:
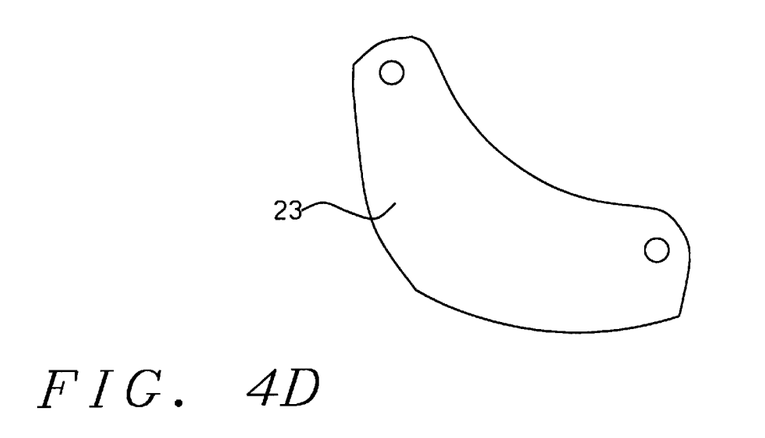
FIG. 4D is a top view of an upper plate of FIG. 4A

A voice coil motor assembly having several design configurations for reducing the number of parts per assembly and with self locking features for fasten-less assembly of a permanent magnet is described. With reference to FIG. 4A, there is shown an exploded side view illustration 20 of a three in one bottom plate 21 configuration of the invention. "Three in one" denotes the integration of posts 25 and 26 with the top surface of bottom plate 22 by metal injection molding. Historically, posts were fastened to the top surface of the bottom plate with an adhesive or screws. Detail 4 shown enlarged in FIG. 4B, illustrates a locking edge profile having a locking angle 33 formed into the side edges 27 of a slot recess 31 on the top surface of the bottom plate 22. The terminal end of the slot 24 is not angled. The locking angle 33 forms a dovetail for holding a permanent magnet 30 against the slot recess surface 31. The side edges 32 of the magnet 30 match the dovetail profile of the slot side edges, while the magnet's front and back arcuate edges are not required to be dovetailed. Referring to FIGS. 4C and 4D, showing the arcuate outlines of the top surfaces of top and bottom plates 22 and 23 respectfully, a truncated tapered slot having side walls forming an open entrance with an arcuate end is designed for removably locking the side edges 32 of the permanent magnet 30 against the confluent sides of the tapered slot 31. It is apparent therefore, that urging the permanent magnet towards the arcuate end of the tapered slot 31 secures the magnet within the tapered slot thus removably locking it in position without the use of adhesives or other form of fastening. Using the three in one voice coil motor design reduces the number of parts inventory from five to three, while reducing the fastening operations from four to one. Top plate 23 requires fastening means to the integrated part 21.

Figure 5A:
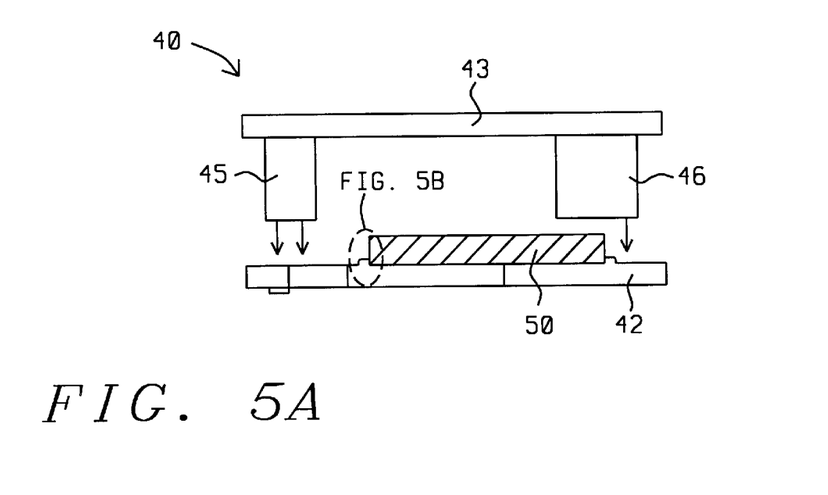
FIG. 5A illustrates a three in one top plate configuration showing an exploded side view of the invention.
Figure 5B:
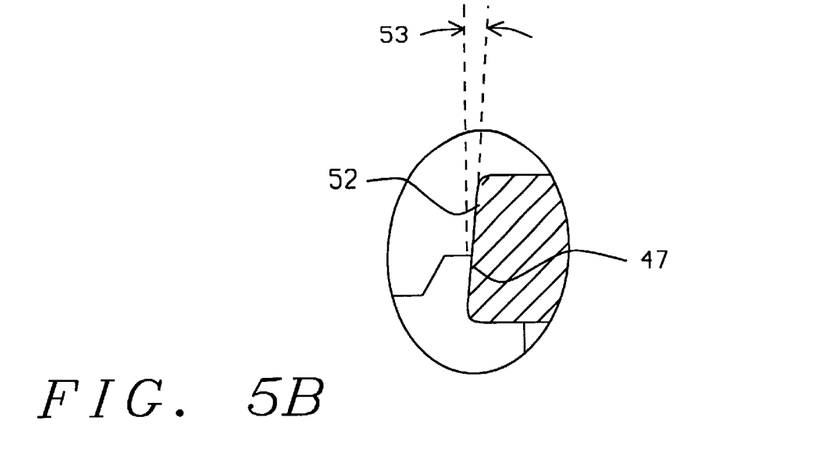
FIG. 5B shows an enlarged fragmented view of Detail 5.
Figure 5C:
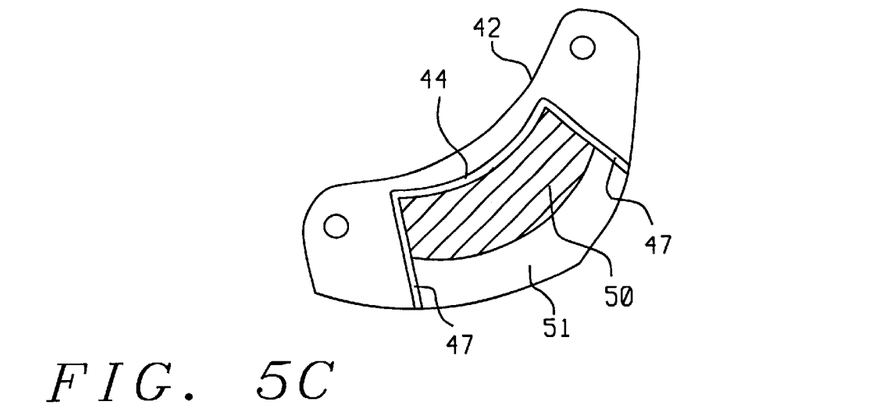
FIG. 5C is a top view of a lower plate of FIG. 5A.
Figure 5D:
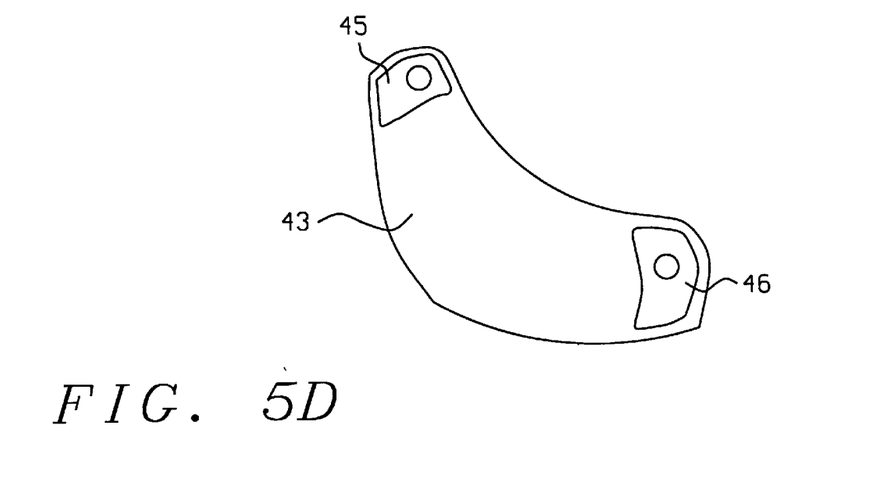
FIG. 5D is a top view of an upper plate of FIG. 5A

A second embodiment of a voice coil motor assembly having a a three in one top plate configuration as opposed to the three in one bottom plate configuration for reducing the number of parts per assembly and with self locking features for a fasten-less assembly of a permanent magnet. With reference to FIG. 5A, there is shown an exploded side view illustration 40 of a three in one top plate configuration of the invention. "Three in one" denotes the integration of posts 45 and 46 with the bottom surface of top plate 43 by metal injection molding. Historically, posts were fastened to the top surface of the bottom plate with an adhesive or screws. Detail 5 shown enlarged in FIG. 5B, illustrates a locking edge profile having a dovetail locking angle 53 formed into the side edges 47 of a slot recess on the top surface of the bottom plate 42. The terminal end of the slot 44 is not angled. The locking angle 53 forms a dovetail for holding a permanent magnet 50 against the slot recess surface 51. The side edges of the magnet match the dovetail profile of the slot side edges, while the magnet's front and back arcuate edges are not required to be dovetailed.. Referring to FIGS. 5C and 5D, illustrating the arcuate outlines of the top surfaces of top and bottom plates 42 and 43 respectfully, a truncated tapered slot having side walls forming an open entrance with an arcuate end is designed for removably locking the side edges 52 of the permanent magnet 50 against the confluent sides of the tapered slot 51. It is therefore apparent that urging the permanent magnet towards the arcuate end secures the magnet within the tapered slot thus removably locking it in place without the use of adhesives or other form of fastening. Using the three in one voice coil motor design reduces the number of parts inventory from five to three, while reducing the fastening operations from four to one. The integrated top plate 43 requires fastening means to the integrated bottom plate 42.

Figure 6A:
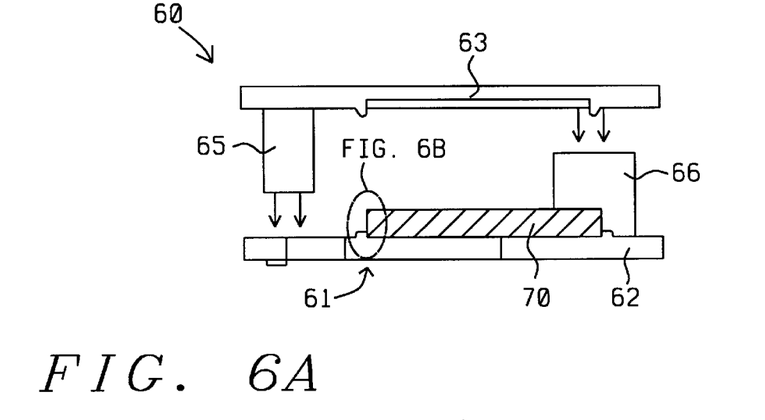
FIG. 6A illustrates a two in one top plate and bottom plate configuration showing an exploded side view of the invention.
Figure 6B:
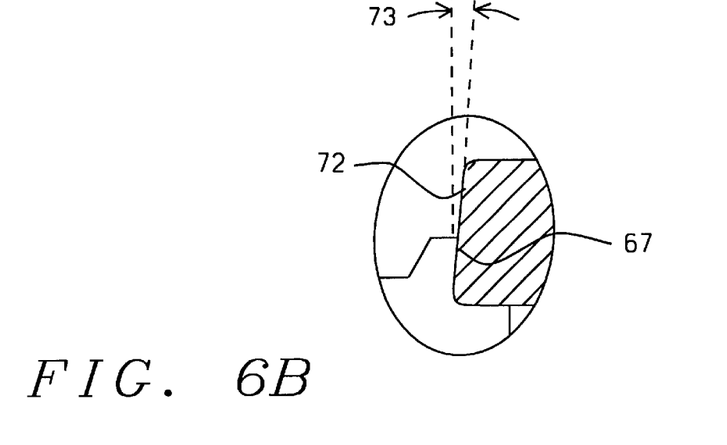
FIG. 6B shows an enlarged fragmented view of Detail 6.
Figure 6C:
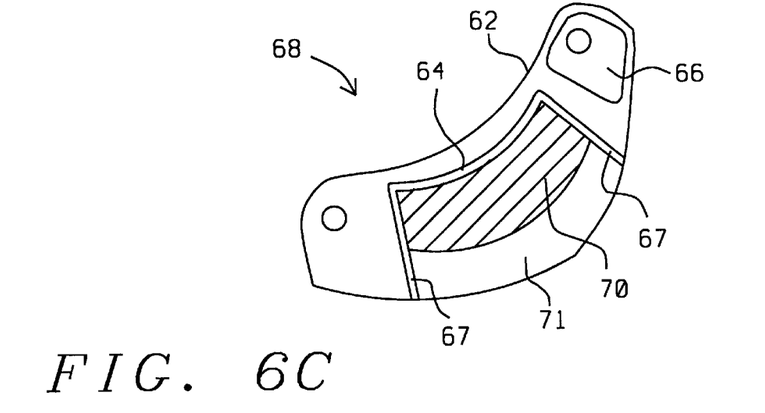
FIG. 6C is a top view of a lower plate of FIG. 6A.
Figure 6D:
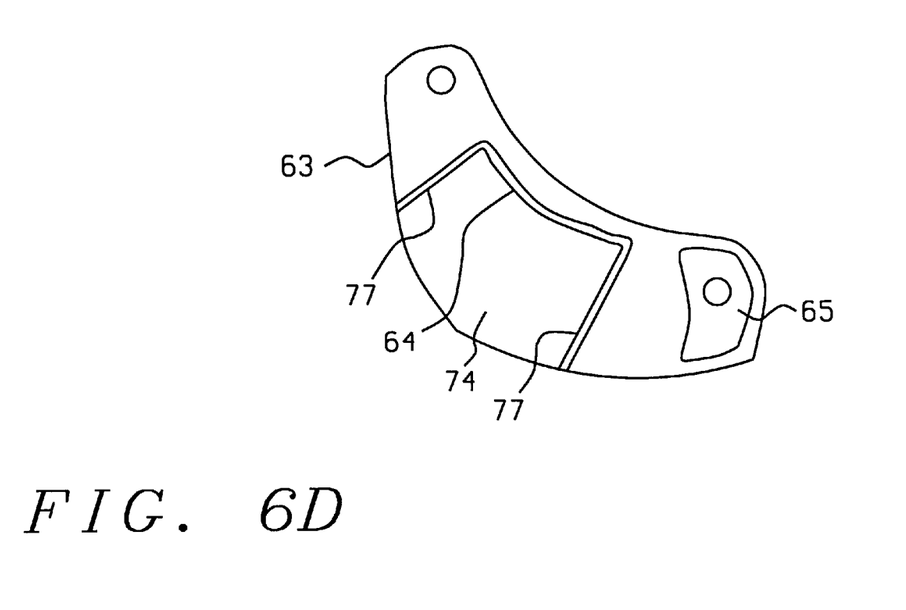
FIG. 6D is a bottom view of an upper plate of FIG. 6A

A third embodiment of a voice coil motor assembly having a two in one top plate and a two in one bottom plate configuration, each contributing to the reduction of the number of parts per assembly and each plate having self locking features for fasten-less assembly for permanent magnets. With reference to FIG. 6A, there is shown an exploded side view illustration of a two in one bottom plate 61 and a two in one top plate 60 configurations of the invention. "Two in one" denotes the integration of post 65 with the bottom surface of top plate 63 while post 66 is molded to the top surface of bottom plate 62 using metal injection molding. Historically, posts were fastened to the top surface of the bottom plate with an adhesive or screws. Detail 6 shown enlarged in FIG. 6B, illustrates an enlarged portion of a locking edge profile having a dovetail locking angle 73 formed into the side edges 67 of a slot recess on the top surface of the bottom plate 62 and the bottom surface of the top plate 63. The terminal end of the slot 64 is not angled. The locking angle 73 forms a dovetail for holding a permanent magnet 70 against the slot recess surface 71 and 74. The side edges 72 of the magnet 70 match the dovetail profile of the slot side edges 67, while the magnet's front and back arcuate edges are not necessary to be dovetailed. Referring to FIGS. 6C and 6D, illustrating the arcuate outlines of the top surfaces of top and bottom plates 62 and 63 respectfully. A truncated tapered slot having side walls forms an open entrance with an arcuate end is designed for removably locking the side edges of a permanent magnet 70 against the confluent sides of the tapered slots 71 and 74. It is therefore apparent, as shown in FIGS. 4A and 5A, that urging the permanent magnet towards the arcuate end of the tapered slot 71 secures the magnet thus removably locking it in place without the use of adhesives or other form of fastening. Using the two in one voice coil motor design reduces the number of parts inventory from five to three, while reducing the fastening operations from four to one. The integrated top plate configuration 60 requires fastening with the integrated bottom plate configuration 61.

Figure 7A:
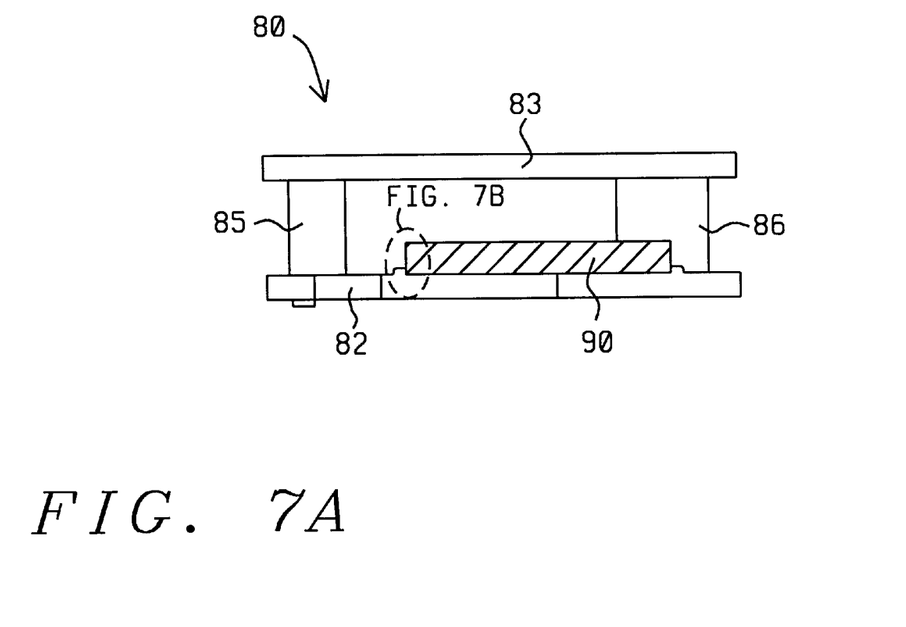
FIG. 7A illustrates a four in one integrated configuration with an exploded side view of the invention.
Figure 7B:
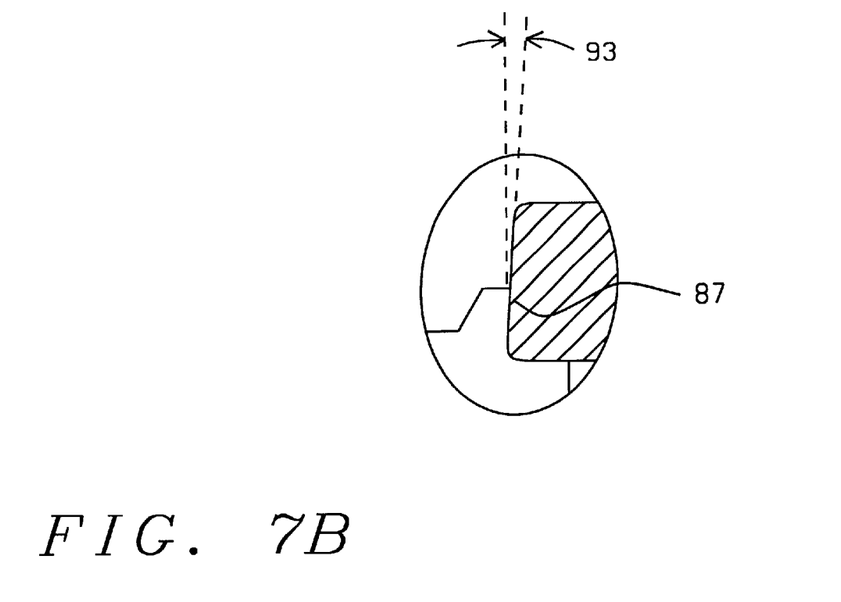
FIG. 7B shows an enlarged fragmented view of Detail 7.
Figure 7C:
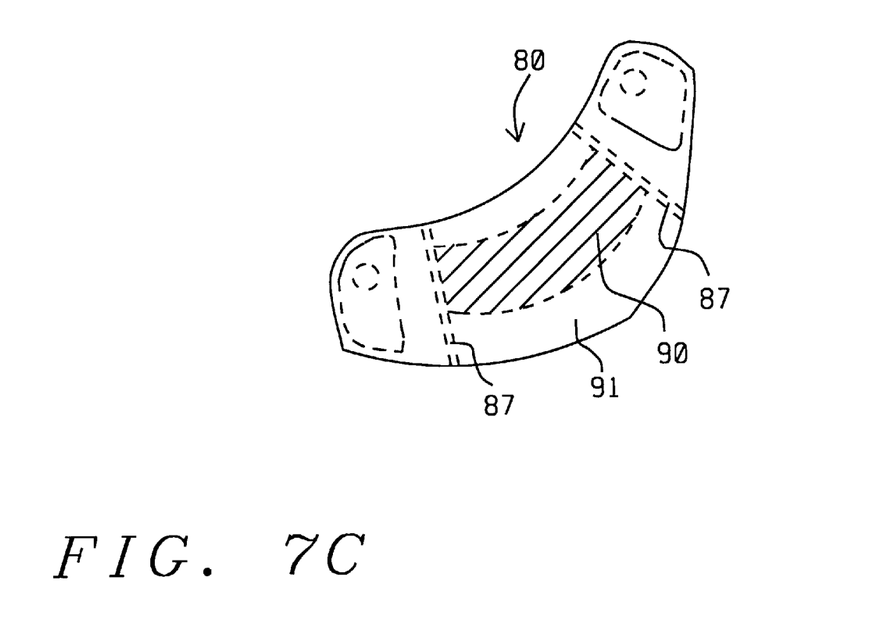
FIG. 7C shows a top view perspective of the integrated configuration of FIG. 7A.

A forth embodiment of a voice coil motor assembly having a four in one configuration. With reference to FIG. 7A, a preferred embodiment, showing a side view of a VCM hollow structure 80. "Four in one" denotes the integration of all four parts which necessarily include, a bottom plate 82 separated from a top plate 83 by two vertical members 85 and 86 therein producing the VCM hollow structure 80 formed by metal injection molding. Detail 7 shown enlarged in FIG. 7B, illustrates a locking edge profile having a dovetail locking angle 93 cast into the side edges 87 of a slot recess on the top surface of the bottom plate member 82. The locking angle forms a dovetail for holding a permanent magnet 90 against the slot recess surface 91. Referring to FIG. 7C, showing the arcuate outline of the VCM hollow structure. A tapered slot 91 that is recessed in the bottom plate member and illustrated with hidden lines has side walls forming a wide entrance opening as compared to the other end. The recessed tapered slot 91 is designed for removably locking the side edges of a permanent magnet 90 against the confluent sides of the tapered slot 91. It is therefore apparent, as in FIGS. 4A, 5A, and 6A, that urging the permanent magnet towards the arcuate end of the open ended slot would wedge the magnet thus removably locking it in place without the use of adhesives or other form of fastening. In this forth embodiment, with reference to FIG. 7A, all the objects of the invention are accomplished and the disadvantages of the prior art overcome by the provision of a disk drive including a voice coil motor assembly which is assembled without the use of adhesives.

While the invention has been particularly shown and described with reference to the preferred embodiments thereof, it will be understood by those skilled in the art that various changes in form and details may be made without departing from the spirit and scope of the invention.

What is claimed is:

1. An interlocking assembly of a voice coil motor for a hard disk drive, said assembly comprising:

an arcuate shaped hollow structure formed by metal injection molding, said hollow structure including a bottom plate member separated from a top plate member by a pair of upright members disposed therebetween, said upright members joining with inside surfaces of said plate members are disposed at each end of said hollow structure, a tapered recess formed into the inside surface of said bottom plate, said recess ingressing from a convex edge of said bottom plate and narrowing while extending through to an opposite concave edge, said tapered recess having side edges shaped to tightly interlock with a dovetail shaped member, and a flat arcuate shaped permanent magnet having dovetail side edges to slidely interlock with said tapered recess of said bottom plate of said hollow structure.

2. The interlocking assembly according to claim 1 wherein said tapered and dovetailed recess secures said permanent magnet to bottom plate without use of fasteners or adhesives.

3. The interlocking assembly according to claim 1 wherein a desired gap is formed between said magnet and said top plate. thereby producing a more concentrated magnetic flux.

4. An interlocking assembly of a voice coil motor for a hard disk drive, said assembly comprising:

an arcuate shaped base member with a top surface and a bottom surfaces said base member having a pair of upright columns molded to said top surface, said upright columns disposed at each end of said base member, a molded tapered recess formed on said top surface between said upright columns, said recess ingressing from a convex edge of said base and narrowing while extending opposite towards a concave edge, said tapered recess having side edges shaped to tightly receive and interlocking with;

a flat arcuate shaped permanent magnet having dovetail side edges to slidely interlock with said tapered recess of said base member, and an arcuate shaped cover plate.

5. The interlocking assembly according to claim 4 wherein said arcuate shaped base with pair of said upright columns is formed by metal injection molding has integrated three of four structural elements of a standard voice coil motor and reduced inventory management.

6. The interlocking assembly according to claim 5 wherein a desired gap is formed between said magnet and said top plate thereby producing a-more concentrated magnetic flux.

7. An interlocking assembly of a voice coil motor for a hard disk drive, said assembly comprising:

an arcuate shaped base member formed by metal injection molding, said base member with a top surface and a bottom surface, a molded tapered and truncated recess formed centrally on said top surface, said recess ingressing from a convex edge of said base and narrowing while extending opposite towards a concave edge, forming a truncated recess, said recess having side edges shaped to tightly receive and to interlock with;

a flat arcuate shaped permanent magnet having dovetail side edges to slidely interlock with said tapered recess of said base member;

an arcuate shaped cover plate having a pair of molded down-reaching columns said columns disposed under and at each end of said base member.

8. The interlocking assembly of claim 7 further comprising said arcuate shaped cover plate with said pair of upright columns is formed by metal injection molding, thus integrating three of four structural elements of a standard voice coil motor while reducing inventory management.

9. The interlocking assembly according to claim 8 wherein said metal injection molding has provided said tapered recess with self locking attributes for removably securing said permanent magnet without using fasteners or adhesives.

10. The interlocking assembly according to claim 8 wherein a desired gap is formed between said magnet and said top plate thereby producing a more concentrated magnetic flux.

11. An interlocking assembly of a voice coil motor for a hard disk drive, said assembly comprising:

an arcuate shaped base member with a top surface and a bottom surface, said base member having an upright column molded to said top surface, said upright column disposed at one end of said base member, a molded tapered and truncated recess formed centrally on said top surface, said recess ingressing from a convex edge of said base and narrowing while extending opposite towards a concave edge forming a truncated recess, said recess having side edges shaped to tightly receive and to interlock with;

a first flat arcuate shaped permanent magnet having dovetail side edges to slidely interlock with said tapered recess of said base member;

an arcuate shaped cover plate with a top surface and a bottom surface, said cover plate having a down-reaching column molded to said bottom surface, said column disposed under and opposite end of said column disposed on base member; said cover plate including a molded tapered and truncated recess formed centrally on surface, said recess ingressing from a convex edge of said cover plate and narrowing while extending opposite towards a concave edge, forming a truncated recess, said recess having side edges shaped to tightly receive and to interlock with;

a second flat arcuate shaped permanent magnet having dovetail side edges to slidely interlock with said tapered recess of said base member.

12. The interlocking assembly of claim 11 further comprising:

said arcuate shaped cover plate and said arcuate shaped base member, each with a supporting column, are formed by metal injection molding thus integrating four structural elements of a standard voice coil motor thereby reducing inventory management.

13. The interlocking assembly according to claim 12 wherein said metal injection molding has provided a tapered recess with self locking attributes for removably securing the permanent magnet without the use of fasteners or adhesives.

14. A method for interlocking an assembly of a voice coil motor for a hard disk drive, comprising the steps of:
provilding an arcuate shaped hollow structure formed by metal injection molding, said hollow structure including a bottom plate member separated from a top plate member by a pair of upright members disposed therebetween, said upright members joining with inside surfaces of said plate members are disposed at each end of said hollow structure, a tapered recess formed into the inside surface of said bottom plate, said recess ingressing from a convex edge of said bottom plate and narrowing while extending through to an opposite concave edge, said tapered recess having side edges shaped to tightly interlock with a dovetail shaped member, and
providing a flat arcuate shaped permanent magnet having dovetail side edges to slidely interlock with said tapered recess of said bottom plate of said hollow structure.

15. The interlocking method of claim 14 further comprising, said metal injection molding of a hollow structure has integrated four structural parts of a standard voice coil motor therefore, eliminating the need for fasteners or adhesives while reducing inventory management of said structural parts.

16. The interlocking method according to claim 14 wherein said metal injection molding of a hollow structure eliminates all failure problems associated with adhesives, such as, adhesive failure between individual parts, long term effects of outgassing and, adhesive spillover at the outside edges.

17. The interlocking method according to claim 14 wherein said metal injection molding provides a tapered recess with self locking attributes for removably securing the permanent magnet without fasteners or adhesives.

18. The interlocking method according to claim 14 wherein a desired gap is formed between said magnet and said top plate thereby producing a more concentrated magnetic flux.

* * * * *